United States Patent
Jung et al.

(10) Patent No.: US 11,440,437 B2
(45) Date of Patent: Sep. 13, 2022

(54) DRIVING CONTROL SYSTEM AND CONTROL METHOD OF FUEL CELL VEHICLE

(71) Applicants: HYUNDAI MOTOR COMPANY, Seoul (KR); KIA MOTORS CORPORATION, Seoul (KR)

(72) Inventors: Jae Kwon Jung, Yongin-si (KR); Dong Hun Lee, Anyang-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 103 days.

(21) Appl. No.: 16/892,562

(22) Filed: Jun. 4, 2020

(65) Prior Publication Data

US 2021/0146798 A1 May 20, 2021

(30) Foreign Application Priority Data

Nov. 15, 2019 (KR) .................. 10-2019-0146861

(51) Int. Cl.

| | |
|---|---|
| *H01M 8/04082* | (2016.01) |
| *B60L 58/33* | (2019.01) |
| *B60L 50/71* | (2019.01) |
| *G01S 19/42* | (2010.01) |
| *B60L 1/00* | (2006.01) |
| *H01M 8/04746* | (2016.01) |

(Continued)

(52) U.S. Cl.
CPC ............. *B60L 58/33* (2019.02); *B60L 1/00* (2013.01); *B60L 3/00* (2013.01); *B60L 50/71* (2019.02); *G01S 19/42* (2013.01); *H01M 8/04201* (2013.01); *H01M 8/04701* (2013.01); *H01M 8/04753* (2013.01); *H01M 2250/20* (2013.01)

(58) Field of Classification Search
CPC .... B60L 1/00; B60L 1/003; B60L 3/00; B60L 50/71; B60L 58/31; B60L 58/33; B60L 58/34; G01S 19/42; H01M 2250/20; H01M 8/04201; H01M 8/04701; H01M 8/04753; Y02E 60/50; Y02T 90/40
See application file for complete search history.

(56) References Cited

U.S. PATENT DOCUMENTS

2018/0034076 A1* 2/2018 Hasegawa ......... H01M 8/04067
2020/0295392 A1* 9/2020 Bono .................. H01M 8/0494

FOREIGN PATENT DOCUMENTS

JP 2007184117 A * 7/2007 ............. Y02E 60/50
KR 2012-0014301 A 2/2012

OTHER PUBLICATIONS

Machine Translation JP2007184117A (Year: 2007).*

* cited by examiner

*Primary Examiner* — Victoria H Lynch
(74) *Attorney, Agent, or Firm* — McDonnell Boehnen Hulbert & Berghoff LLP

(57) ABSTRACT

A driving control system of a fuel cell vehicle includes a fuel cell configured to receive hydrogen and air and generate power by a reaction between hydrogen and oxygen, a driving determiner configured to determine a driving state of a vehicle equipped with the fuel cell, a power calculator configured to calculate required power required to be supplied from the fuel cell, and a supply controller configured to control supply of air supplied to the fuel cell based on the driving state determined by the driving determiner and the required power calculated by the power calculator.

16 Claims, 3 Drawing Sheets

(51) Int. Cl.
*H01M 8/04701* (2016.01)
*B60L 3/00* (2019.01)

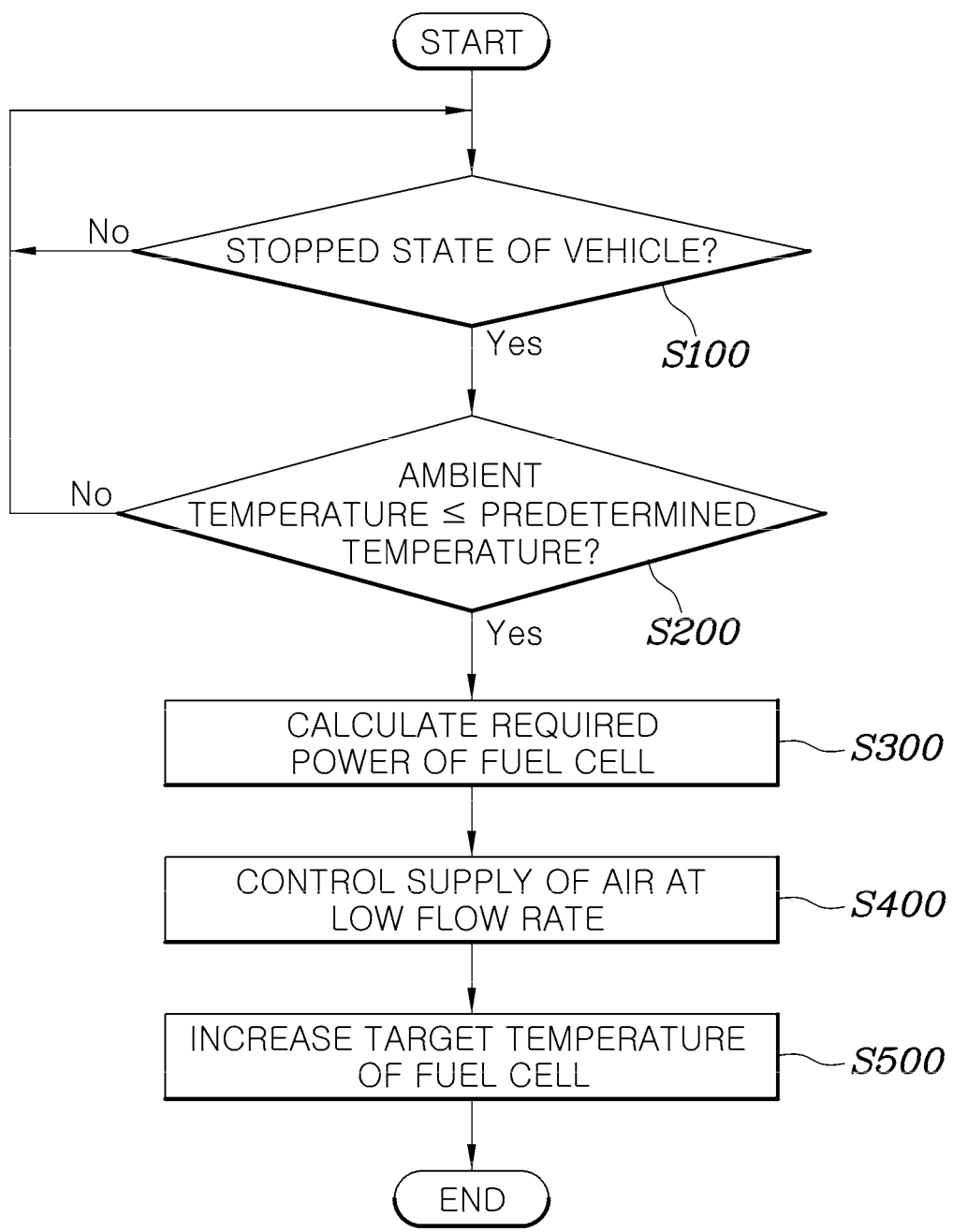

DRIVING CONTROL SYSTEM AND CONTROL METHOD OF FUEL CELL VEHICLE

CROSS REFERENCE TO RELATED APPLICATIONS

The present application claims priority to Korean Patent Application No. 10-2019-0146861, filed Nov. 15, 2019, the entire contents of which is incorporated herein for all purposes by this reference.

BACKGROUND

1. Technical Field

The present disclosure relates to a driving control system and a control method of a fuel cell vehicle, and more particularly, to a driving strategy of a fuel cell in a stopped state of a fuel cell vehicle.

2. Description of the Related Art

A fuel cell, which converts chemical energy into electrical energy using an oxidation-reduction reaction of hydrogen and oxygen respectively supplied from a hydrogen supply device and an air supply device, includes a fuel cell stack producing electrical energy, a cooling system for cooling the fuel cell stack, and the like.

In other words, hydrogen is supplied to an anode of the fuel cell and an oxidation reaction of hydrogen is conducted at the anode to generate protons (i.e., hydrogen ions) and electrons, and the generated protons and electrons migrate to a cathode through an electrolyte membrane and a separator, respectively. In the cathode, electrical energy is generated through an electrochemical reaction involving protons and electrons migrating from the anode, and oxygen in the air.

In particular, generated water $H_2O$ is generated by the electrochemical reaction in which protons and oxygen in the air reacts, and the generated water is discharged to the outside through a humidifier. However, when a fuel cell vehicle continues to generate power while a vehicle is stopped, the generated water may be continuously discharged to a road to form ice on the road, in particular, in the winter.

In addition, when power is generated in a state where the fuel cell vehicle is stopped, large noise may occur from a cooling fan for cooling the fuel cell stack.

The contents described as the related art have been provided only to assist in understanding the background of the present disclosure and should not be considered as corresponding to the related art known to those having ordinary skill in the art.

SUMMARY

An object of the present disclosure is to provide a driving system and method for reducing generated water to be discharged when a fuel cell vehicle is stopped.

According to an embodiment of the present disclosure, a driving control system of a fuel cell vehicle includes a fuel cell configured to receive each of hydrogen and air and generate power by a reaction between hydrogen and oxygen therein, a driving determiner configured to determine a driving state of a vehicle equipped with the fuel cell, a power calculator configured to calculate required power required to be supplied from the fuel cell, and a supply controller configured to control supply of air supplied to the fuel cell based on the driving state determined by the driving determiner and the required power calculated by the power calculator.

The driving determiner may determine whether the vehicle is in a driving state or a stopped state based on vehicle speed information or gear shift stage information of the fuel cell vehicle.

The driving determiner may determine that the vehicle is stopped when the vehicle arrives at a destination based on navigation information.

The power calculator may calculate power consumed by accessories when the driving determiner determines that the vehicle is stopped.

The supply controller may control supply of air at a predetermined ratio of required amount of air including a required amount of oxygen required for generation of the required power in the fuel cell.

When the driving determiner determines that the vehicle is stopped, the predetermined ratio may be determined to be smaller than when the vehicle is determined to be driving.

The supply controller may control the supply of air such that an air supply amount against the required power when the driving determiner determines that the vehicle is stopped is reduced to be smaller than an air supply amount against the required power in a state where the vehicle is driving.

The supply controller may control the supply of air by adjusting a rotation speed of a compressor positioned at an air supply line supplying air to the fuel cell or an opening of a pressure adjustment valve positioned at an air discharge line discharging air from the fuel cell.

The driving control system may further include a temperature sensor configured to measure an ambient temperature, wherein the supply controller may be configured to control the supply of air such that an air supply amount against the required power is reduced when the ambient temperature measured by the temperature sensor is equal to or lower than a predetermined temperature.

The fuel cell may include a plurality of stacks in which a plurality of unit cells are stacked, and the supply controller may control to supply air only to some of the plurality of stacks when the driving determiner determines that the vehicle is stopped.

The driving control system may further include a cooling controller configured to control cooling of the fuel cell based on the driving state determined by the driving determiner.

The cooling controller may increase a target temperature for controlling the cooling of the fuel cell when the driving determiner determines that the vehicle is stopped.

The cooling controller may set the target temperature such that air humidity in the fuel cell is maintained within a predetermined humidity range.

The cooling controller may control a revolution per minute (RPM) of a cooling pump configured to circulate a coolant calculated to the fuel cell or an RPM of a cooling fan configured to allow ambient air to flow to a radiator configured to cool a coolant and ambient air.

According to another embodiment of the present disclosure, a driving control method of a fuel cell vehicle includes determining a driving state of a vehicle equipped with a fuel cell, calculating required power required to be supplied from the fuel cell, and controlling supply of air supplied to the fuel cell based on the determined driving state and the calculated required power.

The controlling of the supply of air may include controlling the supply of air such that an air supply amount against the required power when it is determined that the vehicle is stopped is reduced to be smaller than an air supply amount against the required power in a state where the vehicle is driving.

The method may further include measuring an ambient temperature before the controlling of the supply of air, wherein the controlling of the supply of air may include controlling the supply of air such that an air supply amount against the required power is reduced when the measured ambient temperature is equal to or lower than a predetermined temperature.

The method may further include controlling cooling of the fuel cell based on the determined driving state, after the controlling of the supply of air, wherein the controlling of the cooling of the fuel cell may include: increasing a target temperature for controlling cooling of the fuel cell when it is determined that the vehicle is stopped.

BRIEF DESCRIPTION OF THE FIGURES

FIG. 3 is a flowchart of a driving control method of a fuel cell vehicle according to an embodiment of the present disclosure.

DETAILED DESCRIPTION

Figure 1:
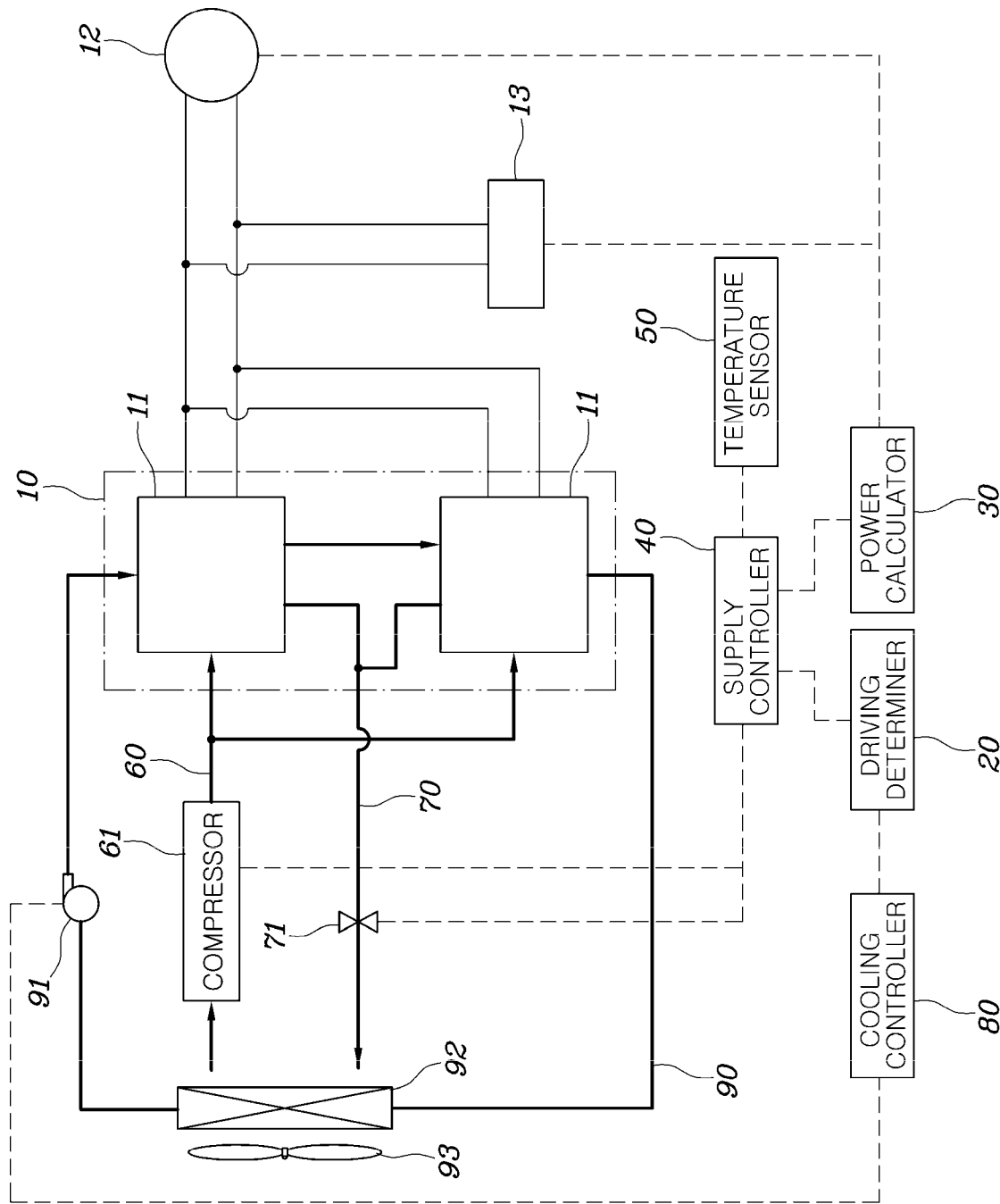
FIG. 1 is a block diagram of a driving control system of a fuel cell vehicle according to an embodiment of the present disclosure.

Specific structural or functional descriptions of the embodiments of the present disclosure disclosed in the specification are exemplified for the purpose of describing the embodiments of the present disclosure only, and the embodiments of the present disclosure may be carried out in various forms and should not be construed to limit the embodiments described herein.

In the present disclosure, various modifications may be applied and various forms may be realized, and thus specific embodiments will be exemplified in the drawings and be described in detail in the specification. However, the present disclosure is not intended to specific disclosure forms, and it will be appreciated that the present disclosure includes all changes, equivalents, or replacements included in the spirit and technical range of the present disclosure.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element, without departing from the scope of the present disclosure.

When it is mentioned that a first element is "connected to" or "electrically connected to" a second element, the first element may be directly connected or electrically connected to the second element, but it should be understood that a third element may intervene therebetween. On the other hand, when it is mentioned that the first element is "directly connected to" or "directly electrically connected to" the second element, it should be understood that there is no third element therebetween. The other expressions for describing a relationship between constituent elements such as "between" and "directly between, or "adjacent to" and "directly adjacent to" are construed in the same way.

The terms used in the application are used to describe specific embodiments only and are not intended to limit the present disclosure. A singular expression includes a plural expression as long as they are clearly distinguished in the context. In the application, it should be understood that the terms such as "comprising", "including" are intended to express that features, numbers, steps, operations, constituent elements, part, or combinations thereof described in the specification are present and do not exclude existence or additions of one or more other features, numbers, steps, operations, constituent elements, part, or combinations thereof.

Unless defined in a different way, all the terms used herein including technical and scientific terms have the same meanings as understood by those skilled in the art to which the present disclosure pertains. Such terms as defined in generally used dictionaries should be construed to have the same meanings as those of the contexts of the related art, and unless clearly defined in the application, they should not be construed to have ideally or excessively formal meanings.

Hereinafter, embodiments of the present disclosure will be described in detail with reference to the accompanying drawings. The same constituent elements in the drawings are denoted by the same reference numerals.

FIG. 1 is a block diagram of a driving control system of a fuel cell vehicle according to an embodiment of the present disclosure.

Referring to FIG. 1, the driving control system of a fuel cell vehicle includes a fuel cell 10 configured to receive hydrogen and air and generate power by a reaction between hydrogen and oxygen, a driving determiner 20 configured to determine a driving state of a vehicle equipped with the fuel cell 10, a power calculator 30 configured to calculate required power required to be supplied from the fuel cell 10, and a supply controller 40 configured to control supply of air supplied to the fuel cell 10 based on the driving state determined by the driving determiner 20 and the required power calculated by the power calculator 30.

The fuel cell 10 includes a fuel cell stack 11, and the fuel cell stack 11 may form a high voltage by stacking a plurality of unit cells and connecting the unit cells in series. The fuel cell stack 11 may be generally configured as a single fuel cell stack, but a plurality of fuel cell stacks 11 may be included in a large vehicle such as a bus or a truck requiring a high current, as shown in FIG. 1.

On an anode side of the fuel cell stack 11, a reaction occurs in which electrons are separated as hydrogen is oxidized to protons. On a cathode side of the fuel cell stack 11, generated water is generated as oxygen reacts with protons and electrons.

As a result, in the fuel cell stack 11, generated water is generated as hydrogen and oxygen react with each other, and the amount of the generated water is increased or decreased depending on a reaction amount of hydrogen and oxygen proportional to the amount of power generated by the fuel cell stack 11.

The fuel cell stack 11 may generate electric power and supply the generated power to a driving system 12 such as a motor, and an accessory 13. The accessory 13, a component other than a driving system, includes components consuming power such as an air-conditioner, light, and the like, as well as components related to the fuel cell 10, such as a compressor 61 supplying air, a pump, a converter, and the like.

Power generated in the fuel cell stack 11 may be consumed in the driving system or consumed in the accessory 13, surplus power may charge a high voltage battery connected through the converter. On the contrary, when power generated in the fuel cell stack 11 is smaller than power consumption of the driving system and the accessory 13, the high voltage battery may be discharged to supplement power.

The driving determiner 20, the power calculator 30, the supply controller 40, and a cooling controller 80 according to an embodiment of the present disclosure may be implemented through an algorithm configured to control an operation of various components of the vehicle, a non-volatile memory (not shown) configured to store data relating to software instructions for reproducing the algorithm, and a processor (not shown) configured to perform an operation described below using data stored in the corresponding memory. Here, the memory and the processor may be implemented as separate chips. Alternatively, the memory and the processor may be integrated with each other so as to be implemented as a single chip. The processor may be one or more processors.

The driving determiner 20 may determine a driving state of the fuel cell vehicle. Specifically, the driving determiner 20 may determine whether the fuel cell vehicle is driven by driving the driving system or whether the fuel cell vehicle is stopped.

In another embodiment, the driving determiner 20 may receive an input of a driver as to whether the vehicle is driving. That is, the driving determiner 20 may automatically determine whether the vehicle is in a stopped state or an input to enter a stop mode of the vehicle may be received from the driver.

The power calculator 30 may calculate required power to be supplied from the fuel cell 10. The required power required from the fuel cell 10 may be the sum of power consumption of the driving system and power consumption of the accessory 13, and when a high voltage battery is required to be charged or discharged, charge power may be added to or discharge power may be subtracted from the sum of power consumption of the driving system and power consumption of the accessory 13.

The supply controller 40 may control supply of air supplied to the fuel cell 10 based on the required power calculated by the power calculator 30.

Hydrogen supplied to the fuel cell stack 11 may be continuously circulated, and power generated in the fuel cell stack 11 may be controlled by an air supply amount controlled by the supply controller 40. That is, the supply controller 40 may control power generation of the fuel cell 10 by varying the supply of air.

The supply controller 40 may control the supply of air to the fuel cell 10 based on the required power calculated by the power calculator 30 and vary the supply of air supplied to the fuel cell 10 based on the driving state determined by the driving determiner 20.

Accordingly, it is possible to implement power generation of the fuel cell 10 suitable for each driving state by controlling the supply of air to the fuel cell stack 11 reflecting the driving state of the vehicle.

In particular, in the case of a police bus or the like in which power is continuously consumed in a state where the vehicle is stopped for a long time, it may be required to control driving of the fuel cell 10 according to the stopped state of the vehicle for a long time.

Specifically, the driving determiner 20 may determine whether the vehicle is in a driving state or a stopped state based on vehicle speed information of the fuel cell 10 vehicle or gear shift stage information.

More specifically, the driving determiner 20 may determine that the vehicle is stopped when a vehicle speed of the fuel cell 10 vehicle is less than or equal to a predetermined speed (e.g., 5 km/h) and may determine that the vehicle is stopped if gear shift stage information is a parking range.

In addition, the driving determiner 20 may determine that the vehicle is stopped if vehicle speed information of the vehicle or the gear shift stage information is maintained in a predetermined condition for a predetermined duration or longer. The predetermined duration may be set to 5 minutes, for example.

The driving determiner 20 may determine that the vehicle is stopped when the vehicle arrives at a destination based on navigation information.

The driving determiner 20 may detect a position of the vehicle using a GPS of the vehicle, and determine that the vehicle is stopped when the position of the vehicle reaches the destination input to the navigation.

The power calculator 30 may calculate power consumed by the accessory 13 as required power when the driving determiner 20 determines that the vehicle is stopped.

When the driving determiner 20 determines that the vehicle is stopped, power consumed by the driving system of the vehicle may be 0 or relatively reduced. Further, the high voltage battery may be maintained without being charged or discharge, while the vehicle is stopped.

Accordingly, when it is determined that the vehicle is stopped, the power calculator 30 may calculate the power consumed by the accessory 13 as the required power of the fuel cell stack 11 as it is.

The supply controller 40 may control the supply of air at a predetermined ratio of a required amount of air including the required amount of oxygen required for power generation in the fuel cell 10.

Power generated in the fuel cell stack 11 may be directly proportional to a consumed amount of oxygen. Accordingly, the required power of the fuel cell 10 and the required amount of oxygen may be directly proportional to each other.

The supply controller 40 may control the air supply amount at a predetermined ratio to the required amount of air including the required amount of oxygen based on the required power of the fuel cell 10. A required amount of air based on the required amount of oxygen may be calculated on the assumption that 20% or 21% of oxygen is included in the required amount of air.

The ratio between the required amount of air and the air supply amount may be set to stoichiometry ratio (SR), and the SR may be previously set to be greater than 1. That is, the supply controller 40 may supply more air than the required amount of air for generating power of the fuel cell stack 11 to the fuel cell stack 11. In one example, the required amount of air to be supplied to the fuel cell is 100 when the power required to generate power in the fuel cell is 100 kW. In the present application, when the power provided to generate power in the fuel cell is 100 kW, by setting SR greater than 1, the amount of air to be supplied to the fuel cell is 120. Therefore, the water in the fuel cell may be removed by oversupplying air to the fuel cell, even if the power generated in the fuel cell is higher than 100 kW.

In particular, the supply controller 40 may control the supply of air to supply more air than the required amount of air to the fuel cell stack 11 so that the SR is greater than 1, when the fuel cell 10 vehicle is driving.

Figure 2:
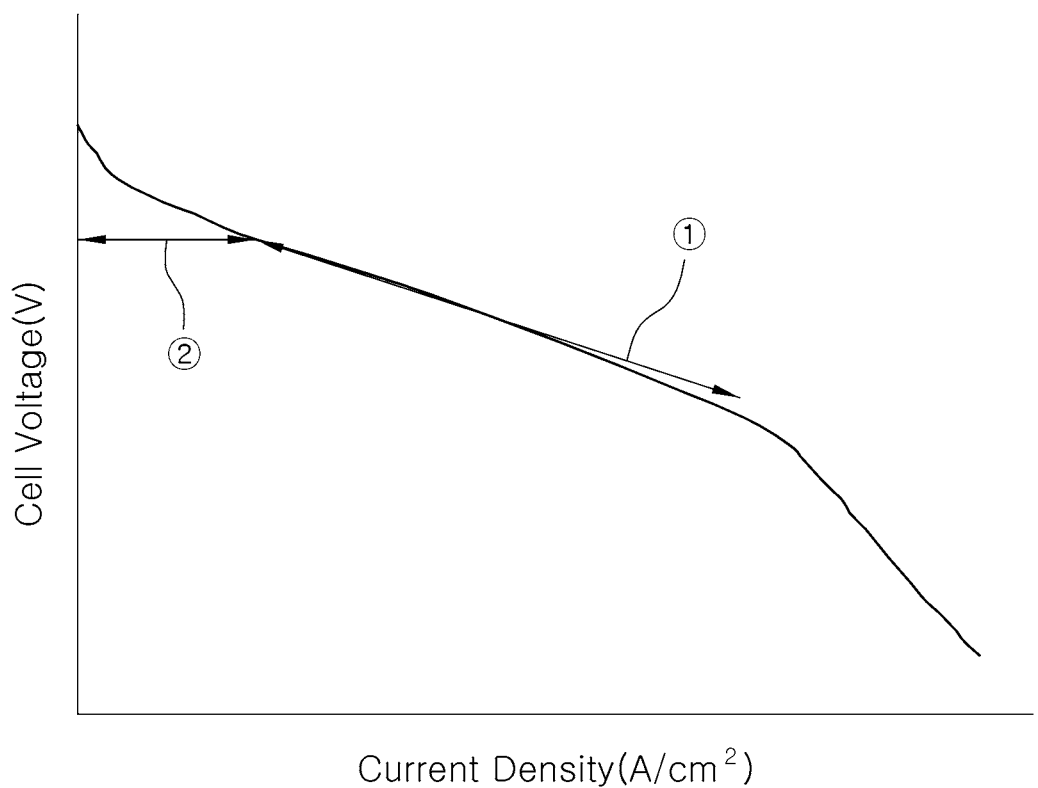
FIG. 2 is an I-V curve of a fuel cell stack according to an embodiment of the present disclosure.

FIG. 2 is an I-V curve of the fuel cell stack 11 according to an embodiment of the present disclosure.

Referring further to FIG. 2, when the same power is generated, an output current and an output voltage of the fuel cell stack 11 may be inversely proportional to each other. The output voltage may be relatively small in a section ① where the output current of the fuel cell stack 11 supplying generated power to the driving system and the accessory 13 is relatively large. In particular, the output current of the fuel cell stack 11 may be relatively large and the output voltage may be relatively small in a state where the fuel cell 10 vehicle is driving.

However, in a section ② where power required in the driving system of the fuel cell 10 vehicle is relatively small or absent or the output current of the fuel cell stack 11 is relatively small, the output voltage may be relatively large. In particular, the output current of the fuel cell stack 11 may be relatively small and the output voltage may be relatively increased while the fuel cell 10 vehicle is stopped.

According to the related art, in a section ② where required power of the fuel cell stack 11 is small, efficiency of the fuel cell stack 11 is intentionally reduced through voltage upper limit controlling such that the fuel cell stack 11 is not exposed to a high potential.

If the battery performs charging in addition to power consumption of the driving system or the accessory 13 or power consumption is suddenly increased unintentionally in the section ② where required power of the fuel cell stack 11 is small, since SR is greater than 1, a current may be generated in a voltage upper limit state, making it difficult to perfectly control power.

According to an embodiment of the present disclosure, the predetermined ratio between the required air amount and the air supply amount may be set to be smaller when the driving determiner 20 determines that the vehicle is stopped than when the driving determiner 20 determines that the vehicle is driving.

Specifically, the supply controller 40 may generate only power corresponding to the required power of the fuel cell 10 by predetermining the predetermined ratio SR close to 1 or 1 in the state where the vehicle is stopped.

The supply controller 40 may control supply of air so that an air supply amount against the required power when the driving determiner 20 determines that the vehicle is stopped is reduced to be smaller than an air supply amount against required power in a state where the vehicle is driving.

That is, the supply controller 40 may reduce the air supply amount against the required power to be smaller when the vehicle is stopped than when the vehicle is driving, and thus, the amount of chemical reaction made in the fuel cell stack 1 1 may be reduced.

Accordingly, it is possible to prevent overproduction of generated water when the vehicle is stopped, and to improve fuel efficiency by reducing loss power generated through intentional voltage upper limit control.

The supply controller 40 may control the supply of air by adjusting a rotation speed of the compressor 61 located in an air supply line 60 for supplying air to the fuel cell 10 or the opening of a power adjustment valve 71 located at an air discharge line 70 for discharging air from the fuel cell 10.

In particular, the supply controller 40 may adjust a flow rate of air flowing through the air supply line 60 and the air discharge line 70 by simultaneously controlling the rotation speed of the compressor 61 and the opening of the pressure adjustment valve 71.

The driving control system for a vehicle may further include a temperature sensor 50 configured to measure an ambient temperature, and the supply controller 40 may control the supply of air such that an air supply amount against required power is reduced when the ambient temperature measured by the temperature sensor 50 is equal to or lower than a predetermined temperature.

The temperature sensor 50 may be a sensor for measuring a temperature of the ambient air, and the supply controller 40 may control to reduce SR so that generated water is generated to be relatively small when the ambient temperature measured by the temperature sensor 50 is equal to or lower than a predetermined temperature.

According to another embodiment, the ambient temperature may be input upon receipt from a server of the Meteorological Agency using a communication network.

In particular, the predetermined temperature may be a temperature at which the generated water may be frozen, and the absolute amount of the generated water is reduced when the generated water discharged to the outside of the fuel cell 10 vehicle is likely to be frozen. Therefore, the generated water due to discharge thereof to the outside of the vehicle in the stopped state may be prevented from being frozen.

In another embodiment, the supply controller 40 may control to supply air to only some of the plurality of stacks when the driving determiner 20 determines that the vehicle is stopped.

When a plurality of fuel cell stacks 11 are included, the supply controller 40 may control to supply air only to some of the plurality of stacks 11 when the vehicle is stopped. Accordingly, a chemical reaction in the fuel cell stacks 11 may be reduced in a state where the required power is relatively low, thereby reducing generation of generated water.

The driving control system for a vehicle may further include the cooling controller 80 configured to control cooling of the fuel cell 10 based on the driving state determined by the driving determiner 20.

Specifically, when the air supply amount is relatively reduced while the vehicle is stopped, the generated water generated in the fuel cell stack 11 may not be discharged to cause flooding.

In order to prevent flooding in the fuel cell stack 11, the cooling controller 80 may control to increase a temperature of the fuel cell 10 by reducing the cooling amount of the fuel cell 10 when the driving determiner 20 determines that the vehicle is stopped. Accordingly, the generated water generated in the fuel cell stack 11 may be discharged to the outside in a gaseous state to prevent flooding due to condensed water.

Specifically, the cooling controller 80 may increase a target temperature for controlling cooling of the fuel cell 10 when the driving determiner 20 determines that the vehicle is stopped.

The cooling controller 80 may control the temperature of the fuel cell 10 to a predetermined target temperature. For example, the cooling system 90 may control to increase or decrease the amount of cooling to cool the fuel cell 10 such that a temperature of the fuel cell 10 is equal to a predetermined target temperature, such as feedback control, proportional integral (PI) control, or the like.

Accordingly, a temperature of the fuel cell stack 11 may be increased and condensed water may be discharged to the outside in a vapor state, and thus, formation of ice around the vehicle may be prevented.

The cooling controller 80 may control an RPM of a cooling pump 91 for circulating the coolant circulated to the fuel cell 10 or an RPM of a cooling fan 93 allowing ambient air to flow to a radiator 92 for cooling the coolant and the ambient air.

The cooling controller 80 may reduce the amount of cooling of the fuel cell 10 by increasing the target temperature when the vehicle is in a stopped state. In particular, the cooling controller 80 may reduce the RPM of the cooling pump 91 or the RPM of the cooling fan 93 allowing ambient air around the radiator 92 to flow.

In another embodiment, the cooling controller 80 may reduce the frequency of operating the cooling pump 91 or cooling fan 93.

Accordingly, vibration and the noise generated due to rotation of the cooling fan 93 or the cooling pump 91 in the stopped state of the vehicle may be reduced.

In general, an increase in the temperature of the fuel cell stack 11 may accelerate deterioration of the fuel cell stack 11. However, in the present disclosure, since power output from the fuel cell stack 11 is relatively small in a state where the vehicle is stopped, acceleration of deterioration of the fuel cell stack 11 may not occur.

In particular, the cooling controller 80 may set the target temperature such that air humidity in the fuel cell 10 is maintained within a predetermined humidity range. The cooling controller 80 may control the target temperature such that humidity of air included in the cathode of the fuel cell stack 11 is maintained within a predetermined humidity range.

The cooling controller 80 may vary the target temperature if air humidity of the cathode in the fuel cell stack 11 is outside a predetermined humidity range in a state where a temperature of the fuel cell stack 11 is the target temperature.

Here, the predetermined humidity range may be set to a range in which generated water is not condensed in the fuel cell stack 11, without affecting durability of the fuel cell stack 11. For example, the predetermined humidity range may be previously set to a relative humidity range between 60% and 70%.

Specifically, the target temperature may be further increased when the air humidity exceeds the predetermined humidity range, and the target temperature may be decreased when the air humidity is below the predetermined humidity range.

FIG. 3 is a flowchart of a driving control method of a fuel cell 10 vehicle according to an embodiment of the present disclosure.

Referring to FIG. 3, the driving control method of the fuel cell 10 vehicle according to an embodiment of the present disclosure includes determining a driving state of a vehicle equipped with the fuel cell 10 (S100), calculating required power required to be supplied from the fuel cell 10 (S300), and controlling supply of air supplied to the fuel cell 10 based on the determined driving state and the calculated required power (S400).

In the controlling of the supply of air (S400), the supply of air may be controlled such that an air supply amount against the required power in a state where the vehicle is stopped is reduced to be smaller than an air supply amount against the required power in a state where the vehicle is driving.

The driving control method may further include measuring an ambient temperature (S200) before the controlling of the supply of air (S400), and in the controlling of the supply of air (S400), the supply of air may be controlled such that the air supply amount against the required power is reduced if the measured ambient temperature is equal to or lower than a predetermined temperature.

The driving control method may further include controlling cooling of the fuel cell 10 based on the driving state determined by the driving determiner 20 after the controlling of the supply of air (S400), and in the controlling of cooling of the fuel cell 10, the target temperature of controlling cooling of the fuel cell 10 may be increased (S500) when the driving determiner 20 determines that the vehicle is stopped.

According to the driving control system and control method of the fuel cell vehicle of the present disclosure, ice is prevented from being formed around a stopped vehicle by reducing the amount of generated water in the stopped state of the vehicle.

Further, since the amount of cooling to cool the fuel cell stack in the stopped vehicle is reduced, noise and vibration caused by the driving of a cooling apparatus may be reduced.

Although the present disclosure has been shown and described with respect to specific embodiments, it will be apparent to those having ordinary skill in the art that the present disclosure may be variously modified and altered without departing from the spirit and scope of the present disclosure as defined by the following claims.

The invention claimed is:

1. A driving control system of a fuel cell vehicle, the driving control system comprising:
   a fuel cell configured to receive each of hydrogen and air and generate power therein by a reaction between hydrogen and oxygen;
   a driving determiner configured to determine a driving state of a vehicle equipped with the fuel cell;
   a power calculator configured to calculate required power required to be supplied from the fuel cell; and
   a supply controller configured to control supply of air supplied to the fuel cell based on the driving state determined by the driving determiner and the required power calculated by the power calculator
   wherein the driving determiner determines whether the vehicle is in a driving state or a stopped state based on vehicle speed information or gear shift stage information of the fuel cell vehicle; and
   wherein the power calculator calculates power consumed by accessories when the driving determiner determines that the vehicle is stopped.

2. The driving control system of claim 1, wherein the driving determiner determines that the vehicle is stopped when the vehicle arrives at a destination based on navigation information.

3. The driving control system of claim 1, wherein the supply controller controls supply of air at a predetermined ratio of required amount of air including a required amount of oxygen required for generation of the required power in the fuel cell.

4. The driving control system of claim 3, wherein when the driving determiner determines that the vehicle is stopped, the predetermined ratio is determined to be smaller than when the vehicle is determined to be driving.

5. The driving control system of claim 1, wherein the supply controller controls the supply of air such that an air supply amount against the required power when the driving determiner determines that the vehicle is stopped is reduced to be smaller than an air supply amount against the required power in a state where the vehicle is driving.

6. The driving control system of claim 1, wherein the supply controller controls the supply of air by adjusting a rotation speed of a compressor positioned at an air supply line supplying air to the fuel cell or an opening of a pressure adjustment valve positioned at an air discharge line discharging air from the fuel cell.

7. The driving control system of claim 1, further comprising:
   a temperature sensor configured to measure an ambient temperature,
   wherein the supply controller is configured to control the supply of air such that an air supply amount against the required power is reduced when the ambient temperature measured by the temperature sensor is equal to or lower than a predetermined temperature.

8. The driving control system of claim 1, wherein the fuel cell includes a plurality of stacks in which a plurality of unit cells are stacked, and the supply controller controls to supply air only to some of the plurality of stacks when the driving determiner determines that the vehicle is stopped.

9. The driving control system of claim 1, further comprising:
a cooling controller configured to control cooling of the fuel cell based on the driving state determined by the driving determiner.

10. The driving control system of claim 9, wherein the cooling controller increases a target temperature for controlling the cooling of the fuel cell when the driving determiner determines that the vehicle is stopped.

11. The driving control system of claim 10, wherein the cooling controller sets the target temperature such that air humidity in the fuel cell is maintained within a predetermined humidity range.

12. The driving control system of claim 9, wherein the cooling controller controls a revolution per minute (RPM) of a cooling pump configured to circulate a coolant calculated to the fuel cell or an RPM of a cooling fan configured to allow ambient air to flow to a radiator configured to cool a coolant and ambient air.

13. A driving control method of a fuel cell vehicle, the driving control method comprising:
determining a driving state of a vehicle equipped with a fuel cell;
calculating required power required to be supplied from the fuel cell; and
controlling supply of air supplied to the fuel cell based on the determined driving state and the calculated required power;
wherein the driving determiner determines whether the vehicle is in a driving state or a stopped state based on vehicle speed information or gear shift stage information of the fuel cell vehicle; and
wherein the power calculator calculates power consumed by accessories when the driving determiner determines that the vehicle is stopped.

14. The driving control method of claim 13, wherein the controlling of the supply of air includes controlling the supply of air such that an air supply amount against the required power when it is determined that the vehicle is stopped is reduced to be smaller than an air supply amount against the required power in a state where the vehicle is driving.

15. The driving control method of claim 13, further comprising:
measuring an ambient temperature before the controlling of the supply of air,
wherein the controlling of the supply of air includes controlling the supply of air such that an air supply amount against the required power is reduced when the measured ambient temperature is equal to or lower than a predetermined temperature.

16. The driving control method of claim 13, further comprising:
controlling cooling of the fuel cell based on the determined driving state, after the controlling of the supply of air,
wherein the controlling of the cooling of the fuel cell includes increasing a target temperature for controlling cooling of the fuel cell when it is determined that the vehicle is stopped.

* * * * *